United States Patent
Weed

(10) Patent No.: US 10,514,463 B2
(45) Date of Patent: Dec. 24, 2019

(54) GROUND-BASED SYSTEM AND METHOD TO MONITOR FOR EXCESSIVE DELAY GRADIENTS USING LONG REFERENCE RECEIVER SEPARATION DISTANCES

(71) Applicant: Honeywell International Inc., Morris Plains, NJ (US)

(72) Inventor: Douglas Mark Weed, Forest Lake, MN (US)

(73) Assignee: Honeywell International Inc., Morris Plains, NJ (US)

( * ) Notice: Subject to any disclaimer, the term of this patent is extended or adjusted under 35 U.S.C. 154(b) by 578 days.

(21) Appl. No.: 15/085,894

(22) Filed: Mar. 30, 2016

(65) Prior Publication Data

US 2017/0212242 A1 Jul. 27, 2017

Related U.S. Application Data

(60) Provisional application No. 62/287,312, filed on Jan. 26, 2016.

(51) Int. Cl.
*G01S 19/07* (2010.01)
*G01S 19/08* (2010.01)
(Continued)

(52) U.S. Cl.
CPC .............. *G01S 19/07* (2013.01); *G01S 19/08* (2013.01); *G01S 19/43* (2013.01); *G01S 19/258* (2013.01); *G01S 19/41* (2013.01)

(58) Field of Classification Search
CPC .......... G01S 19/07; G01S 19/08; G01S 19/41; G01S 19/258
(Continued)

(56) References Cited

U.S. PATENT DOCUMENTS 5,451,964 A 9/1995 Babu
6,603,426 B1 * 8/2003 Clark .................. G01S 19/10
342/357.64
(Continued)

FOREIGN PATENT DOCUMENTS

JP 5305416 10/2013
WO 0122111 3/2001

OTHER PUBLICATIONS

European Patent Office, "Extended European Search Report for EP Application No. 16197624.6", "Foreign Counterpart to U.S. Appl. No. 15/085,894", dated Jun. 6, 2017, pp. 1-14, Published in: EP.
(Continued)

*Primary Examiner* — Chuong P Nguyen
(74) *Attorney, Agent, or Firm* — Fogg & Powers LLC

(57) ABSTRACT

Systems and methods for monitoring excessive delay gradients using long reference receiver separation distances are provided. In one embodiment, a ground-based system comprising a plurality of reference receivers configured to receive satellite signals. The ground-based system further comprises a processor coupled to a memory. The processor is configured to determine whether the line of sight of a newly available satellite is within a gradient. The processor is further configured to determine a monitor measurement using accumulated carrier data for each pair of reference receivers of a plurality of reference receiver pairs. The processor is further configured to combine monitor measurements for a subset of the plurality of reference receiver pairs into a monitor discriminator. The processor is further configured to output an alert when the monitor discriminator exceeds a threshold.

20 Claims, 5 Drawing Sheets

(51) Int. Cl.
*G01S 19/43* (2010.01)
*G01S 19/41* (2010.01)
*G01S 19/25* (2010.01)

(58) Field of Classification Search
USPC .................... 342/357.44, 357.45, 357.24
See application file for complete search history.

(56) References Cited

U.S. PATENT DOCUMENTS

| | | | | |
|---|---|---|---|---|
| 6,674,398 | B2* | 1/2004 | Murphy | G01S 19/00 342/357.21 |
| 7,095,369 | B1* | 8/2006 | Clark | G01S 19/02 342/357.58 |
| 7,868,820 | B2* | 1/2011 | Kolb | G01S 19/04 342/357.26 |
| 8,094,064 | B2* | 1/2012 | Brenner | G01S 19/08 342/357.26 |
| 8,723,725 | B2* | 5/2014 | Zhao | G01S 19/40 342/357.23 |
| 9,557,418 | B2* | 1/2017 | Weed | G01S 19/04 |
| 9,581,698 | B2* | 2/2017 | Weed | G01S 19/08 |
| 9,599,716 | B2* | 3/2017 | Weed | G01S 19/04 |
| 9,921,314 | B2* | 3/2018 | Jakel | G01S 19/07 |
| 9,989,644 | B2* | 6/2018 | Johnson | G01S 19/07 |
| 2005/0146461 | A1* | 7/2005 | Pande | G01S 19/07 342/357.44 |
| 2011/0215965 | A1* | 9/2011 | Brenner | G01S 19/08 342/357.24 |
| 2015/0219766 | A1 | 8/2015 | Weed et al. | |
| 2015/0293230 | A1 | 10/2015 | Weed et al. | |
| 2015/0293231 | A1 | 10/2015 | Weed et al. | |
| 2016/0282470 | A1* | 9/2016 | McDonald | G01S 19/05 |
| 2016/0306047 | A1* | 10/2016 | Jakel | G01S 19/07 |

OTHER PUBLICATIONS

Harris et al., "Putting the Standardized GBAS Ionospheric Anomaly Monitors to the Test", "GNSS 2009—Processing of the 22nd International Technical Meeting of the Satellite Division of the Institute of Navigation (Ion GNSS 2009)", Sep. 25, 2009, pp. 1124-1140, Publisher: The Institute of Navigation.

Jing, "Instantaneous Detection of Spatial Gradient Errors in Differential GNSS", "8th Annual PNT Symposium—Stanford Center for Position, Navigation and Time", Oct. 28, 2014, pp. 1-23, Retrieved from the Internet: https://web.stanford.edu/group/scpnt/pnt/PNT14/2014_Presentation_Files/S11.Jing_SCPNT.pdf.

Saito et al., "Absolute Gradient Monitoring for GAST-D with a Single-Frequency Carrier-Phase based and Code-Aided Technique", "GNSS 2012—Proceedings of the 25th International Technical Meeting of the Satellite Division of the Intitute of Navigation (Ion GNSS 2012)", Sep. 21, 2012, pp. 2184-2190, Publisher: The Institute of Navigation.

Belabbas et al., "Carrier Phase and Code Based Absolute Slant Ionosphere Gradient Monitor for GBAS", "25th International Technical Meeting of the Satellite Division of the Institute of Navigation, Sep. 17-21, 2012",, pp. 1-8.

Saito et al., "Ionospheric Delay Gradient Analysis With the Single-Frequency Carrier-Base and Code Aided Method", "The Fifth Meeting of Ionospheric Studies Task Force (ISTF/5) Feb. 16-18, 2015",, pp. 1-8, Published in: Okinawa, Japan.

European Patent Office, "Communication Pursuant to Article 94(3) for EP Application No. 16197624.6 dated Oct. 30, 2018", Foreign Counterpart to U.S. Appl. No. 15/085,894, pp. 1-7.

Petovello et al., "GNSS Solutions: Carrier phase and its measurement for GNSS" InsideGNSS, Jul. 1, 2010, pp. 18-22.

* cited by examiner

GROUND-BASED SYSTEM AND METHOD TO MONITOR FOR EXCESSIVE DELAY GRADIENTS USING LONG REFERENCE RECEIVER SEPARATION DISTANCES

PRIORITY CLAIM

The present application claims priority to, and the benefit of, U.S. Provisional Patent Application No. 62/287,312, entitled "GROUND-BASED SYSTEM AND METHOD TO MONITOR FOR EXCESSIVE DELAY GRADIENTS USING LONG REFERENCE RECEIVER SEPARATION DISTANCES", which was filed on Jan. 26, 2016, the disclosure of which is incorporated herein by reference in its entirety.

STATEMENT REGARDING FEDERALLY SPONSORED RESEARCH OR DEVELOPMENT

This invention was made with Government support under Government Contract Number DTFACT-10-C-00013 and agency FAA William J. Hughes Technical Center. The Government has certain rights in the invention.

BACKGROUND

The Ground Based Augmentation System (GBAS) Approach Service Type D (GAST D) standard shares the mitigation of ionosphere gradient threat between the ground and airborne subsystems. This leads to the need for an ionosphere gradient monitor (IGM) located in the ground subsystem in order to ensure the integrity of the system is not compromised in the presence of an ionosphere gradient threat. Previous IGMs utilize carrier phase double difference measurements over multiple sets of ground based GPS reference receiver pairs spaced over short baselines. Due to utilizing the carrier phase data, this short baseline IGM design is limited to a maximum reference receiver separation distance (approximately 300 meters) and is limited to a maximum detectable ionosphere gradient magnitude (approximately 500 mm/km).

The short baseline IGM design is also sensitive to non-ionosphere gradients (also referred to as tropospheric gradients) which can occur frequently, and exceed the IGM detection threshold generating false monitor alarms, which cause the short baseline IGM to become ineffective at mitigating ionosphere gradients. Tropospheric gradients are a recent unexpected noise source discovered while developing the short baseline IGM. These tropospheric gradients generally occur in the afternoon on hot sunny days.

The GAST D standard also requires mitigation of errors in the satellite broadcast ephemeris data such that the probability of incorrectly detecting an ephemeris error versus the differential range error, as experienced by the aircraft, generated by this ephemeris error meets the GAST D Standards and Recommended Practices. Current approaches for mitigating the ephemeris broadcast error involve five different monitors, all of which are an indirect measurement of the differential range error being mitigated. The current five monitor design has been susceptible to false alarms which can require excluding usage of a satellite for a two day readmittance period.

For the reasons stated above and for other reasons stated below which will become apparent to those skilled in the art upon reading and understanding the specification, there is a need in the art for improved systems and methods for mitigating ionosphere gradients and ephemeris errors while also reducing susceptibility to troposphere gradient noise.

SUMMARY

The embodiments of the present disclosure provide systems and methods for monitoring excessive delay gradients using long reference receiver separation distances and will be understood by reading and studying the following specification.

In one embodiment, a ground-based system comprising a plurality of reference receivers configured to receive satellite signals. The ground-based system further comprises a processor coupled to a memory. The processor is configured to determine whether the line of sight of a newly available satellite is within a gradient. The processor is further configured to determine a monitor measurement using accumulated carrier data for each pair of reference receivers of a plurality of reference receiver pairs. The processor is further configured to combine monitor measurements for a subset of the plurality of reference receiver pairs into a monitor discriminator. The processor is further configured to output an alert when the monitor discriminator exceeds a threshold.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
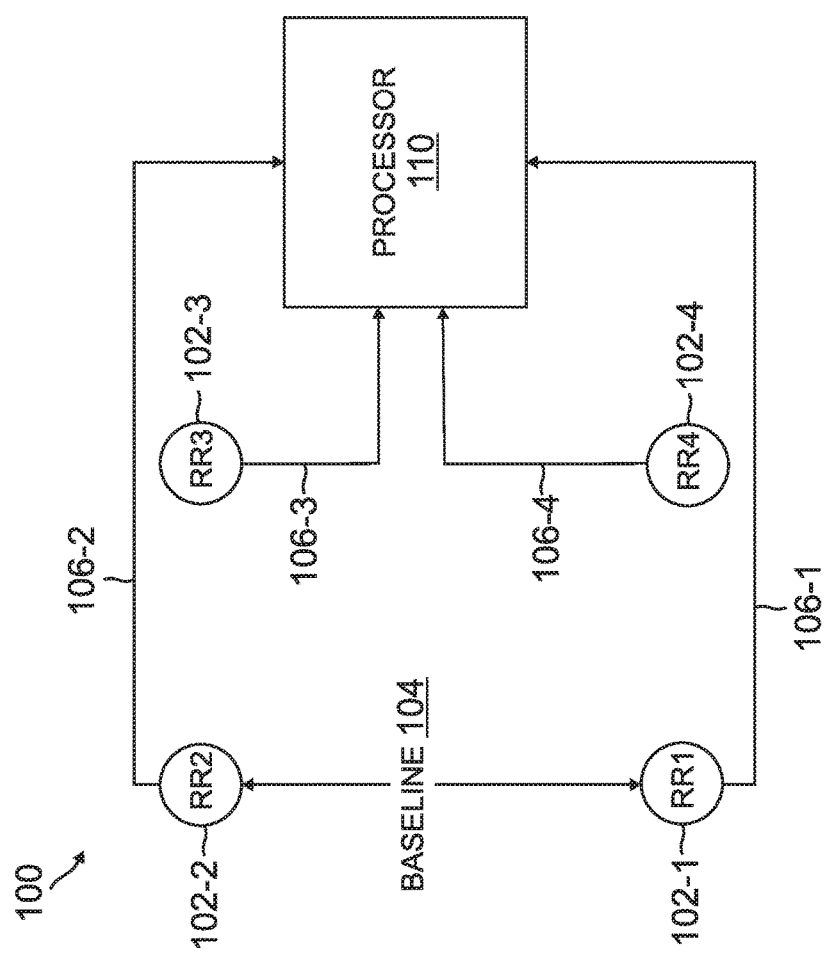
FIG. 1 is a block diagram of an example ground-based system that uses an ionosphere gradient monitor according to one embodiment of the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present disclosure provide for systems and methods of monitoring excessive delay gradients using long reference receiver separation distances. The systems and methods described herein use accumulated carrier data (instead of carrier phase) to generate the ionosphere gradient monitor (IGM) measurements and discriminator. In doing so, the systems and methods enable long baseline reference receiver separation distances (for example, greater than 300 meters) because accumulated carrier measurements are not limited by the angular phase of the carrier signal like carrier phase measurements. Further, by increasing the separation distances beyond that of the short baseline IGM, the systems and methods described herein enable detection of larger ionosphere gradient magnitudes and have reduced sensitivity to the frequently occurring non-ionosphere gradient. Further, the systems and methods described herein may reduce the number of monitors required for the ground-based system and apply the IGM design for detecting ephemeris error or ephemeris gradients.

As used herein, the term accumulated carrier data refers to measurement data received from a reference receiver/satellite pair which is comprised of the accumulation of the carrier phase cycles, converted to meters, which have been received since first tracking the satellite signal. The term "accumulated carrier data" is used interchangeably with "carrier range" or "carrier range error."

FIG. 1 is a block diagram of one exemplary embodiment of a ground-based system that uses an ionosphere gradient monitor (IGM). In exemplary embodiments, the ground-based system is a ground station for a Ground Based Augmentation System (GBAS). Although the ground-based system described herein is for an airport landing system, the concepts can be implemented in any system that requires accurate GNSS information and is not limited for use with aircraft and/or ground-based systems for aircraft.

As shown in FIG. 1, ground-based system 100 includes a plurality of reference receivers 102 and a processor 110. The reference receivers 102 are ground reference receivers. As is understood, each reference receiver 102 is a radio frequency receiver with an antenna. During operation, the reference receivers 102 receive radio frequency signals from satellites. The reference receivers 102 are communicatively coupled to the processor 110 through a wired or wireless communication link 106. While four reference receivers are shown in FIG. 1, it is to be understood that ground-based system 100 can include either more or less reference receivers depending on the requirements of the ground-based system 100. In particular, ground-based system 100 may include two or more reference receivers.

During operation, the reference receivers 102 will be organized into pairs to enable detection of ionosphere gradients. Each pair of reference receivers includes two reference receivers 102. When a system (for example, system 100) includes four reference receivers 102, up to six reference receiver pairs may be formed. In the example embodiment shown in FIG. 1, the reference receiver pairs would be RR12, RR13, RR14, RR23, RR24, and RR34. The two reference receivers 102 in each pair are separated by a baseline (also referred to herein as a separation distance). The baseline between the RR1 102-1 and RR2 102-2 is indicated as baseline 104. In some embodiments, the ground-based system implements a short baseline IGM. In other embodiments, the ground-based system 100 implements a long baseline IGM. In such embodiments, the baseline between the reference receivers 102 is greater than 300 meters. In some embodiments, the baseline between the reference receivers 102 can range from one to three kilometers. It should be understood that the other lengths of the baseline may be used depending on the desired performance of the system 100.

The processor 110 includes or functions with software programs, firmware or other computer readable instructions for carrying out various methods, process tasks, calculations, and control functions, used in the functions provided in the methods 200, 300, 400 described herein.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Figure 2:
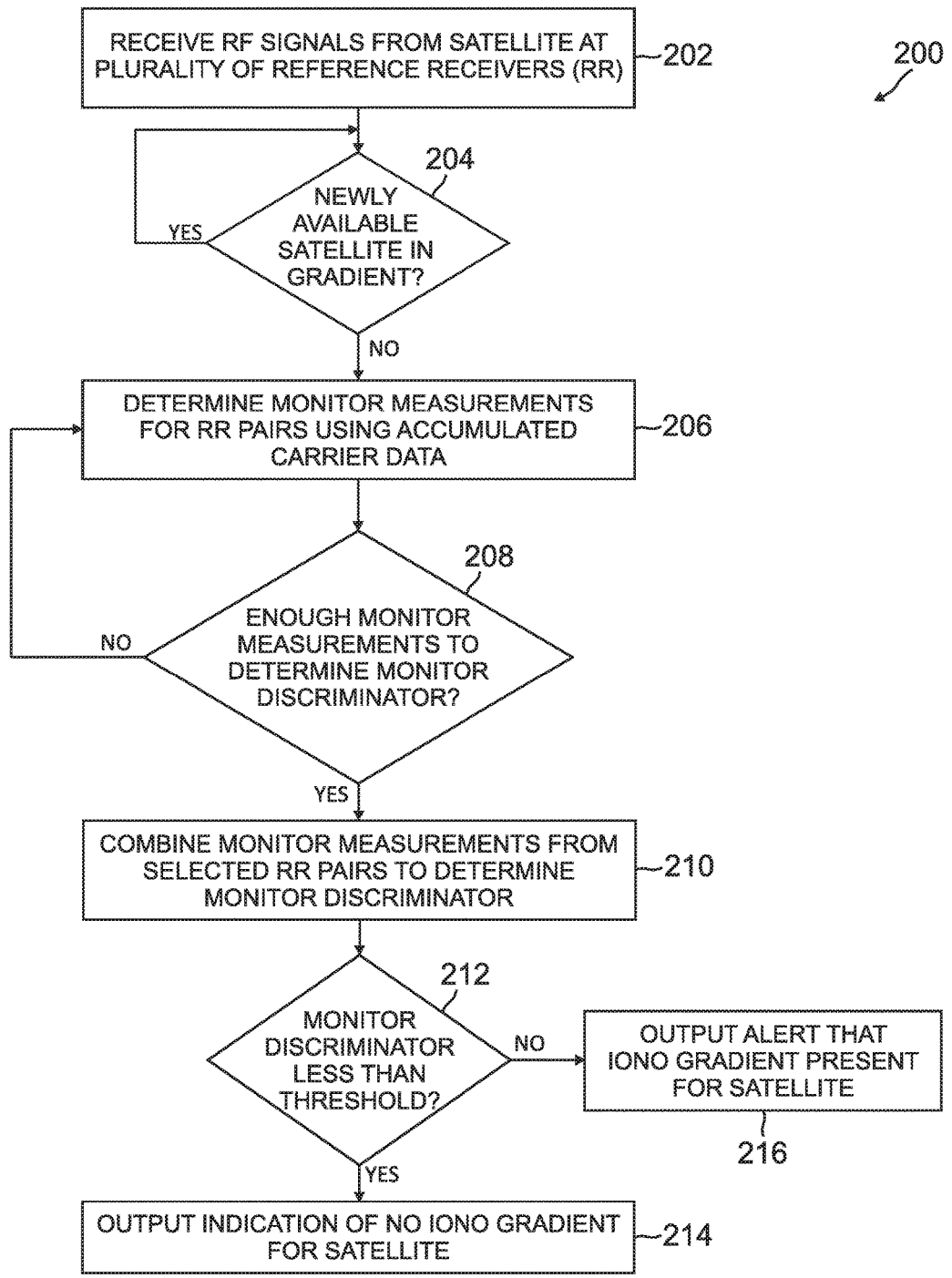
FIG. 2 is a flow diagram of an example method of operating an ionosphere gradient monitor.

FIG. 2 is an example method of operating an ionosphere gradient monitor (IGM) according to one embodiment of the present disclosure. The functions, structures, and other description of elements for such embodiments described above may apply to like named elements of method 200 and vice versa.

The method begins with receiving radio frequency (RF) signals from a satellite at a plurality of reference receivers (block 202). In exemplary embodiments, the signals comprise Global Navigation Satellite System (GNSS) pseudorange code and carrier signals.

The method proceeds with determining whether a newly available satellite is in an ionosphere gradient (block 204). In exemplary embodiments, a newly available satellite includes a rising satellite, a satellite readmitted from exclusion, or the like. A satellite rising in an ionosphere gradient is when the line of sight of a satellite rising into view is within an ionosphere gradient. Step 204 is an initialization test that utilizes code measurements from the satellite. In one embodiment, this determination is performed in parallel for each pair of reference receivers. This initialization test assures that the use of the carrier range techniques discussed herein are valid. Further details of the determination for step 204 are included herein with respect to FIG. 3.

In exemplary embodiments, the determination of whether the line of sight of a newly available satellite is within a gradient includes determining whether other monitors (such as, for example, a code carrier divergence (CCD) monitor) of the ground-based system declare that the newly available satellite is excluded. In some embodiments, the other monitors are considered prior to performing the steps included in method 300, which is described below with respect to FIG. 3. In such embodiments, if the other monitor indicates that a newly available satellite is excluded, then the steps of method 300 are not performed until the other monitor indicates that a newly available satellite is no longer excluded.

When the newly available satellite is within an ionosphere gradient for a particular pair of reference receivers, the method 200 repeats the process of step 204 for that particular pair of reference receivers.

When the newly available satellite is not within an ionosphere gradient, the method proceeds with determining monitor measurements for pairs of reference receivers using accumulated carrier data, as defined above (block 206). In one embodiment, this determination is performed in parallel for each pair of reference receivers once the respective pair of reference receivers passes the initialization test of step 204 (i.e., the line of sight of the satellite is not within an ionosphere gradient for the pair of reference receivers). In exemplary embodiments, the monitor measurements are determined using method 400 described herein with respect to FIG. 4.

The method proceeds with determining whether enough monitor measurements are available to determine a monitor discriminator value (block 208). The terms "monitor discriminator" and "gradient estimate" are used interchangeably throughout the present application. In exemplary embodiments, the number of monitor measurements considered to be enough varies depending on the amount of reference receiver pairs. In the embodiment of FIG. 1 where six reference receiver pairs are formed, at least three monitor measurements from respective pairs of reference receivers that include all four reference receivers are required. In other embodiments, a different amount of monitor measurements may be used.

When there are enough monitor measurements available, the method proceeds with combining monitor measurements for selected pairs of reference receivers to determine the monitor discriminator (block 210). In exemplary embodiments, the monitor measurements are combined using a least squares estimator. For example, the monitor measurements are combined using the least squares technique described in U.S. Pat. No. 8,094,064 (the '064 patent), which is herein incorporated by reference. In exemplary embodiments, the pairs of reference receivers are selected with a selector function based on which combination of monitor measurements will result in a smallest ionosphere gradient estimate. In other embodiments, the pairs of reference receivers are selected with a selector function based on which combination of monitor measurements will result in the largest ionosphere gradient estimate. In other embodiments, the pairs of reference receivers are selected with a selector function using the smallest parity method described in U.S. Patent Publication 2015/0219766, which is herein incorporated by reference.

The method proceeds with determining whether the monitor discriminator is below a selected threshold (block 212). When the monitor discriminator is below the selected threshold, the method proceeds with outputting an indication that no ionosphere gradient is present for the satellite (block 214).

When the monitor discriminator is above the selected threshold, the method proceeds with outputting an alert that an ionosphere gradient is present for the satellite (block 216). In exemplary embodiments, information from the satellite will be excluded from any broadcast to aircraft or other vehicles. Further, information from an excluded satellite may not be used for other monitors or calculations.

Figure 3:
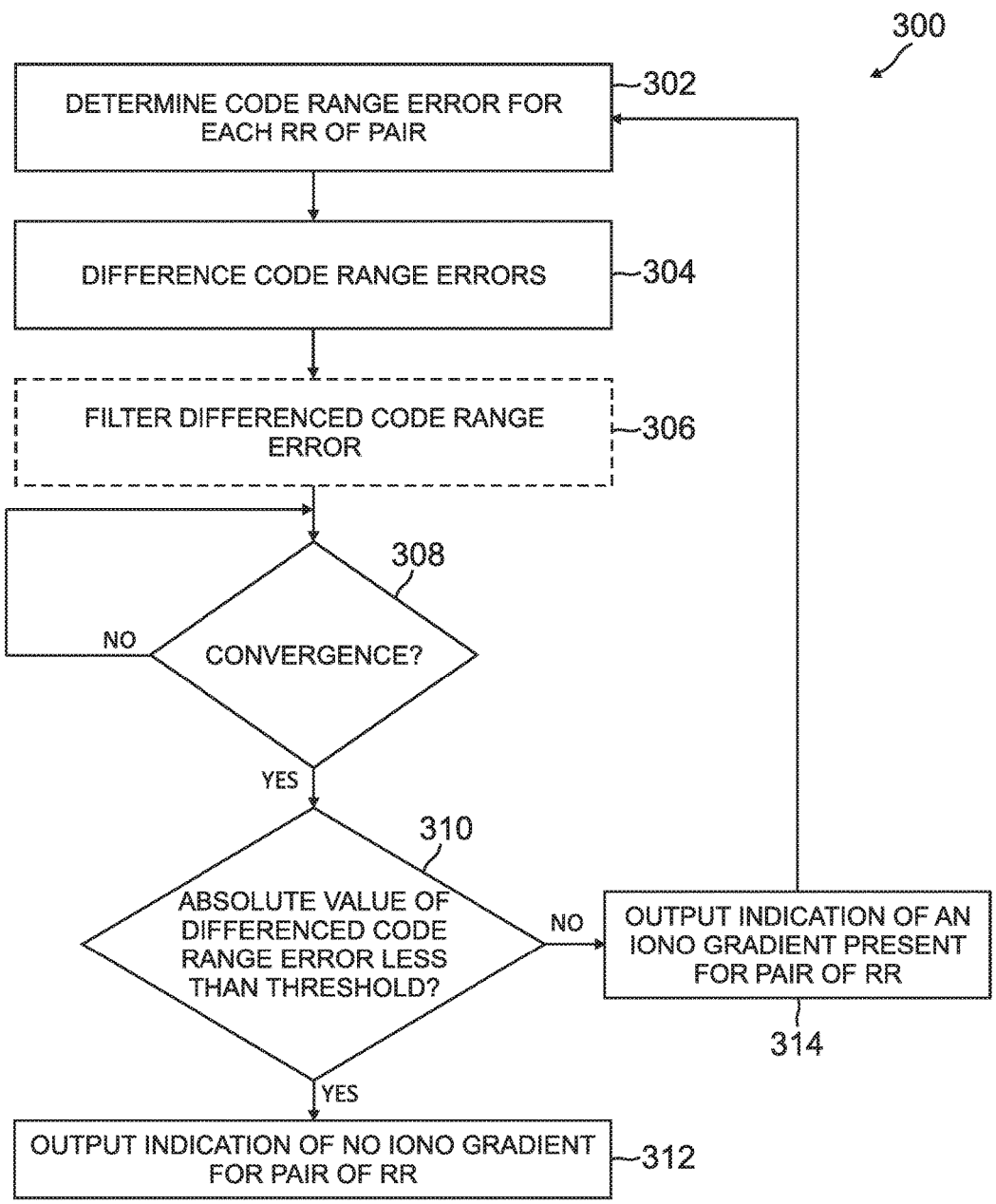
FIG. 3 is a flow diagram of an example method of initializing an ionosphere gradient monitor.

FIG. 3 is a flow diagram of an example method 300 of determining whether a newly available satellite is within an ionosphere gradient. Method 300 also is an example initialization test for an ionosphere gradient monitor (IGM). The functions, structures, and other description of elements for such embodiments described above may apply to like named elements of method 300 and vice versa. In exemplary embodiments, the method 300 is performed by the processor 110 discussed above with reference to FIG. 1. As discussed above, the steps of method 300 are performed in parallel for each pair of reference receivers.

The method 300 begins with determining code range errors for each reference receiver of a pair of reference receivers (block 302). In exemplary embodiments, the determination begins for a newly available satellite (for example, a rising satellite) when the satellite is above three degrees of elevation. In exemplary embodiments, the code range error (CRE) for a particular reference receiver is calculated using the following equation:

$$CRE=(PR-TRUE\_RANGE).\qquad\text{Eq. 1}$$

PR is the calculated distance between the satellite and the reference receiver using the pseudorange. TRUE_RANGE is the calculated distance between the satellite and the reference receiver using the ephemeris data and the known location of the reference receiver. In exemplary embodiments, determining code range errors for each reference receiver further includes applying compensations. For example, the compensations may include, but are not limited to, phase center adjustments, troposphere model, and code-based site-specific masking.

The method proceeds with differencing the code range errors for the reference receivers of the pair of reference receivers (block 304). In exemplary embodiments, the difference between the code range error (DCRE) for a pair of reference receivers is calculated using the following equation:

$$DCRE_{RR_{i,j}}=(PR-TRUE\_RANGE)_{RR_i}-(PR-TRUE\_RANGE)_{RR_j}\qquad\text{Eq. 2}$$

In exemplary embodiments, further compensations are applied to the differenced code range error. For example, these compensations may account for relative antenna error (e.g., spherical harmonics), relative clock bias, relative ephemeris mismatches, or the like.

The method optionally proceeds with filtering the differenced code range error value for a selected period of time (block 306). In exemplary embodiments, the filtering is performed with a 50 second time constant. It should be understood that other time constants can be used for filtering depending on the desired performance of the system.

The method proceeds with determining whether the differenced code range error has converged (block 308). In exemplary embodiments, this determination comprises waiting a selected period. When the optional filtering is performed as described above with respect to block 306, the selected period of time has a specific relationship with the filtering time constant. In exemplary embodiments, the selected period of time for this determination is twice as long as the filtering time constant. It should be understood that other lengths of time for determining convergence of the differenced carrier range error and other ratios between filtering and determining convergence can be used depending on the desired performance of the system.

When the differenced code range error has converged, the method proceeds with determining whether the absolute value of the differenced code range error is below a threshold (block 310). In exemplary embodiments, the threshold is approximately 9.5 centimeters. This value corresponds to the normal noise conditions experienced for an IGM. This value also corresponds to approximately one-half of a GPS carrier wavelength. It should be understood that other thresholds could also be used for the threshold depending on the desired performance of the system.

When the absolute value of the differenced code range error is below the threshold, the method proceeds with outputting an indication that an ionosphere gradient is not present for the pair of reference receivers (block 312). In exemplary embodiments, the indication comprises a logical value of 1. Upon outputting the indication that an ionosphere gradient is not present for the pair of reference receivers, carrier range error values of the pair of reference receivers can be determined.

When the absolute value of the differenced code range error is not below the threshold, the method proceeds with outputting an indication that an ionosphere gradient is present for the pair of reference receivers (block 314). In exemplary embodiments, the indication comprises a logical value of 0. In some embodiments, the method 300 repeats the process described above with respect to block 302-310 until it is determined that there is no ionosphere gradient. In other embodiments, the method 300 terminates once it has been determined that an ionosphere gradient is not present for a selected amount of reference receiver pairs. For example, the selected amount may be two or more reference receiver pairs for system 100. In exemplary embodiments, when two or more reference receiver pairs pass the initialization test (e.g., complete step 312), the two or more reference receiver pairs are used to generate a gradient estimate as discussed below with respect to method 400 of FIG. 4. In such embodiments, when the gradient estimate is below a threshold for the two or more reference receiver pairs, then it is determined that no ionosphere gradient is present for all reference receiver pairs and method 300 terminates for all reference receiver pairs.

Figure 4:
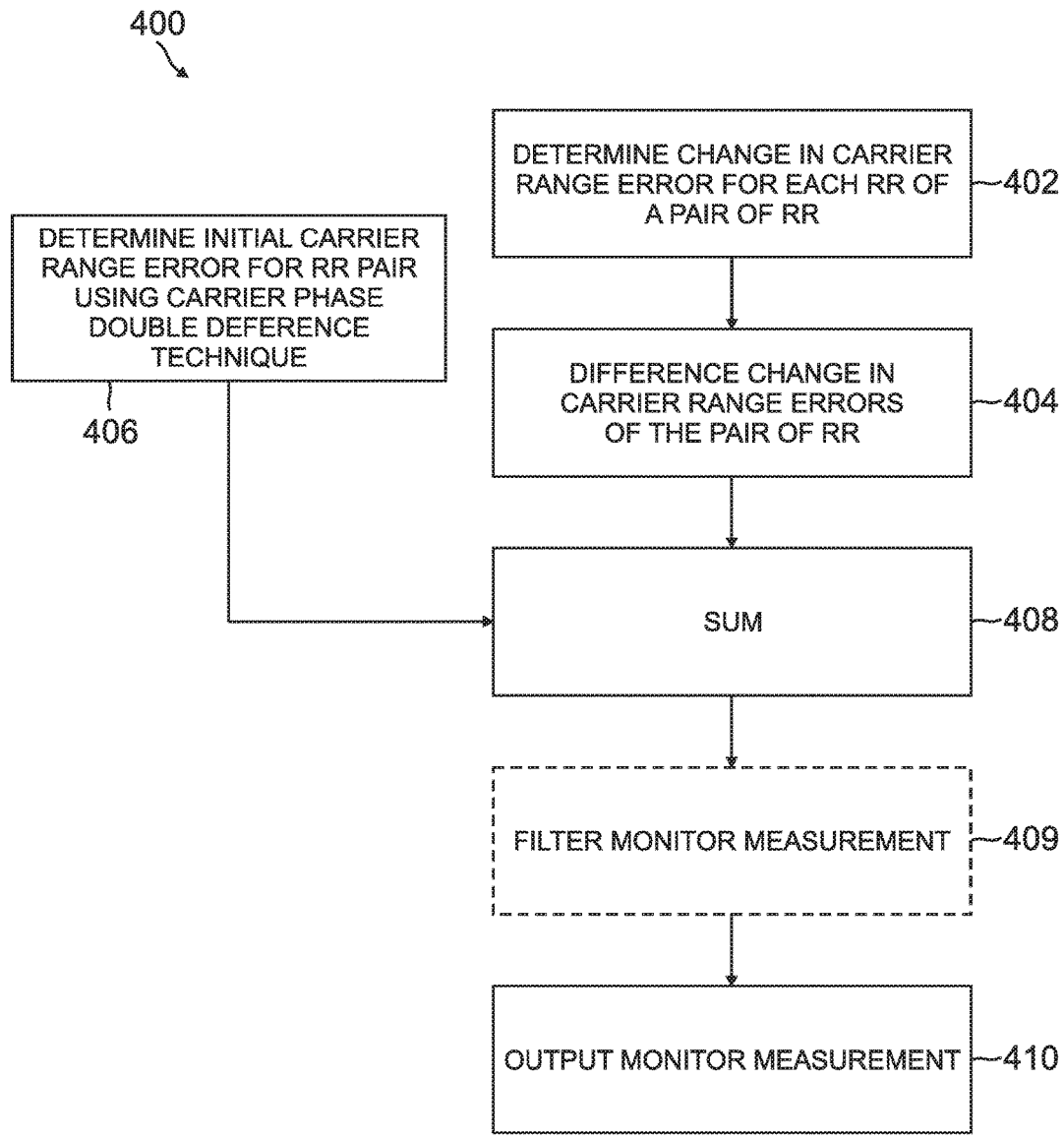
FIG. 4 is a flow diagram of an example method of obtaining monitor measurements for an ionosphere gradient monitor.

FIG. 4 is a flow diagram of an example method 400 of determining a monitor discriminator for an ionosphere gradient monitor (IGM) according to one embodiment of the present disclosure. The functions, structures, and other description of elements for such embodiments described above may apply to like named elements of method 400 and vice versa. In exemplary embodiments, the method 400 is performed by the processor 110 discussed above with reference to FIG. 1.

The method 400 begins with determining a change in carrier range error for each reference receiver of a pair of reference receivers (block 402). In exemplary embodiments, the change in carrier range error (CCRE) for a particular reference receiver is calculated using the following equation:

$$CCRE=((acc(t)-acc(t0))-(TRUE\_RANGE(t)-TRUE\_RANGE(t0))).$$ Eq. 3

Acc(t) is the accumulated carrier value at time t and Acc(t0) is the initial accumulated carrier value. TRUE_RANGE is the calculated distance between the satellite and the reference receiver using the ephemeris data and the known location of the reference receiver. In exemplary embodiments, determining the change in carrier range errors for each reference receiver further includes applying compensations. For example, the compensations may include, but are not limited to, phase center adjustments, troposphere model, and carrier-based site-specific masking. The like-named compensations described with respect to FIG. 3 may be the same or similar to these compensations. In other embodiments, the compensations are unique to carrier-based calculations.

The method proceeds with differencing the change in carrier range errors for the reference receivers of the pair of reference receivers (block 404). In exemplary embodiments, further compensations are applied to the differenced change in carrier range error. For example, these compensations may account for relative antenna error (e.g., spherical harmonics), relative clock bias, relative ephemeris mismatches, or the like. In some embodiments, the like-named compensations described with respect to FIG. 3 may be the same or similar to these compensations. In other embodiments, the compensations are unique to carrier-based calculations.

In parallel with steps 402 and 404, the method includes determining the initial carrier range error for the particular reference receiver pair using the carrier phase double differencing technique (block 406). In exemplary embodiments, the carrier phase double differencing technique is similar to that discussed in the '064 patent.

The method proceeds with summing the differenced carrier range error for the pair of reference receivers with the initial carrier range error determined using the carrier phase double differencing technique (block 408).

The method optionally proceeds with filtering the monitor measurement for a selected period of time (block 409). In exemplary embodiments, the monitor measurement is filtered with a three second time constant.

The method proceeds with outputting the monitor measurement (block 410). In exemplary embodiments, the monitor measurement is output to the selector function described above with respect to FIG. 2.

In some embodiments, method 400 further includes a feedback loop for reducing the error on the monitor measurements. In such embodiments, the carrier range error is determined continuously using the carrier phase double differencing technique. The feedback loop includes comparing the carrier range error determined using the carrier phase double differencing technique with the differenced change in carrier range error. When the values are different, an error signal is generated and summed with the differenced change in carrier range error. In some embodiments, the error signal is averaged over time so the average error signal is summed with the differenced change in carrier range error. In exemplary embodiments, the error signal may also include corrections for constant or slow changing errors. For example, some of the compensations (such as, for example, phase center adjustments) may be applied with the error signal.

Figure 5:
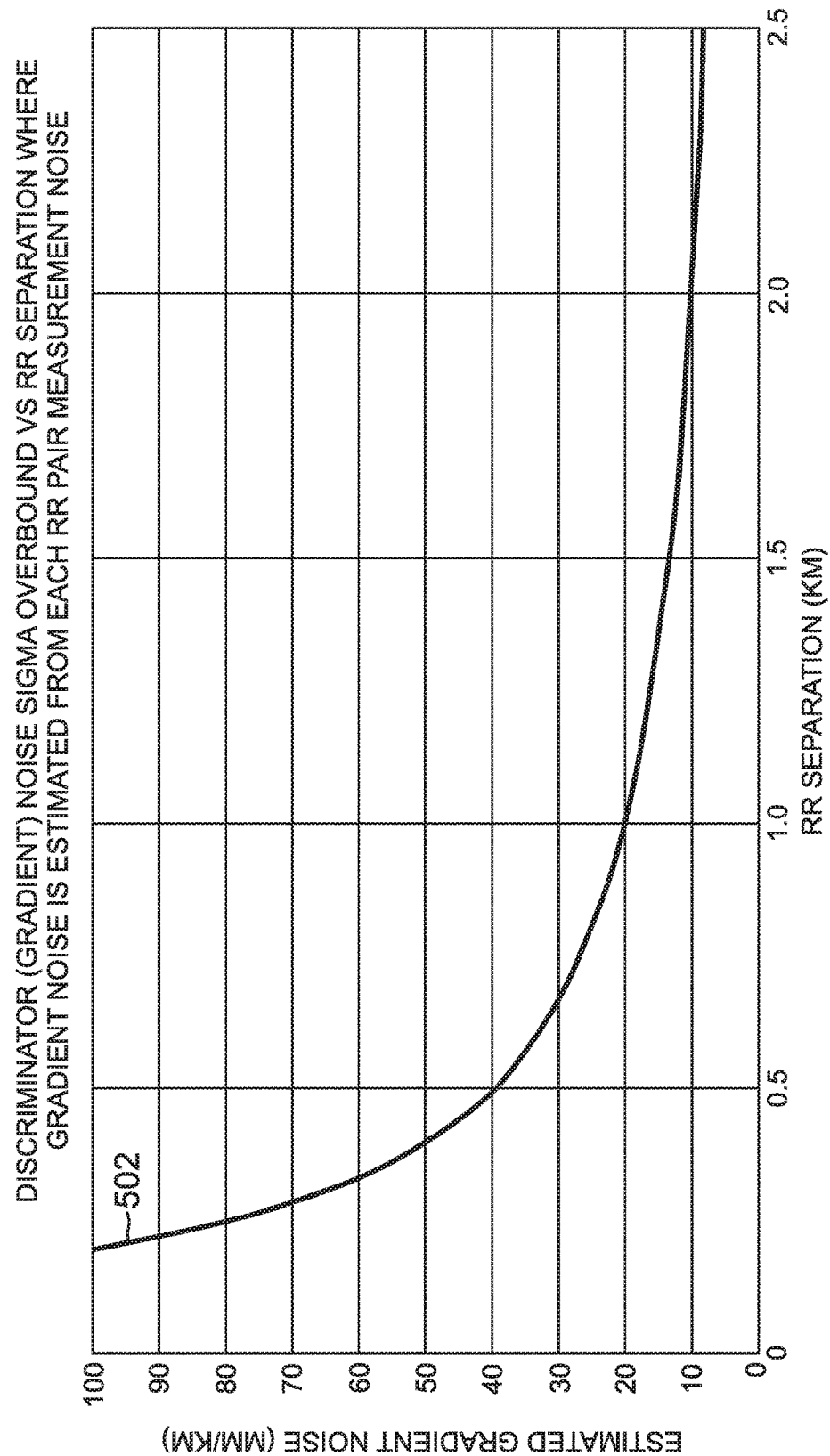
FIG. 5 is a graph of the estimated gradient noise versus the separation distance between reference receivers according to one embodiment of the present disclosure.

The systems and methods discussed above demonstrate a viable long baseline IGM that is less sensitive to troposphere gradients than the short baseline IGMs. FIG. 5 is a graph of the estimated gradient noise versus the separation distance. Line 502 represents an approximation of the estimated noise gradient data at different separation distances. As shown in FIG. 5, the sensitivity to troposphere gradient noise is reduced by the greater reference receiver separation as a function of (1/RR separation). So, for example, moving the reference receiver separation from 300 meters to 900 meters provides an approximate reduction of two-thirds in the sensitivity to troposphere gradient noise. Further, by using differenced carrier range error computed from accumulated carrier data between reference receivers, the long baseline IGM is able to detect larger ionosphere gradients.

While the above system and methods are described as detecting ionosphere gradients, the system and methods may also be used for the detection of an ephemeris gradient or other ephemeris error. An ephemeris gradient means an ephemeris differential range error across an array of GBAS reference receivers. The system above directly measures the differential range. In particular, while executing the IGM as described above with respect to FIGS. 2-4, ephemeris corruption or another ephemeris problem may also cause the IGM to exceed its threshold.

If the initialization test described with respect to FIG. 3 determines that an ionosphere gradient is not present, but it is determined that the monitor discriminator exceeds the threshold, this may indicate that an ephemeris error or gradient is occurring. Accordingly, by setting the appropriate threshold for the monitor discriminator, the IGM and methods discussed above may be used to detect ephemeris errors or gradients. In exemplary embodiments, the threshold may be different for detecting ephemeris errors than for detecting ionosphere gradients.

By identifying ephemeris errors in this manner, the system does not require five monitors to indirectly measure the differential range error. Further, once an ephemeris error has been corrected by the GNSS Operational Control Segment, the IGM satellite re-admittance time is approximately one minute, which is significantly less than the approximately two days required for re-admittance with current techniques.

EXAMPLE EMBODIMENTS

Example 1 includes a ground-based system comprising: a plurality of reference receivers configured to receive satellite signals; and a processor coupled to a memory, wherein the processor is configured to: determine whether the line of sight of a newly available satellite is within a gradient; determine a monitor measurement using accumulated carrier data for each pair of reference receivers of a plurality of reference receiver pairs; combine monitor measurements for a subset of the plurality of reference receiver pairs into a monitor discriminator; and output an alert when the monitor discriminator exceeds a threshold.

Example 2 includes the system of Example 1, wherein determine whether the line of sight of a newly available satellite is within a gradient includes determining whether the line of sight of a newly available satellite is within at least one of: an ionosphere gradient; and an ephemeris gradient.

Example 3 includes the system of any of Examples 1-2, wherein determine whether the line of sight of a newly available satellite is within a gradient includes determining whether a code carrier divergence (CCD) monitor indicates that the newly available satellite is within a gradient.

Example 4 includes the system of any of Examples 1-3, wherein the plurality of reference receivers includes four reference receivers.

Example 5 includes the system of Example 4, wherein the subset of the plurality of reference receiver pairs includes two or more reference receiver pairs.

Example 6 includes the system of Example 5, wherein the two or more reference receiver pairs includes three reference receiver pairs, wherein the three reference receiver pairs collectively include all four reference receivers.

Example 7 includes the system of any of Examples 1-6, wherein the alert indicates that an ionosphere gradient is present for the satellite.

Example 8 includes the system of any of Examples 1-7, wherein the alert indicates that an ephemeris error is present for the satellite.

Example 9 includes the system of any of Examples 1-8, wherein the ground-based system is a Ground Based Augmentation System.

Example 10 includes a method of operating an ionosphere gradient monitor, the method comprising: receiving radio frequency signals from a newly available satellite at a plurality of reference receivers; determining whether the line of sight of the newly available satellite is within a gradient; determining a monitor measurement using accumulated carrier data for each pair of reference receivers of a plurality of reference receiver pairs; combining monitor measurements for a subset of the plurality of reference receiver pairs into a monitor discriminator; and outputting an alert when the monitor discriminator exceeds a first threshold.

Example 11 includes the method of Example 10, wherein determining whether the line of sight of the newly available satellite is within a gradient comprises: determining a code range error for each reference receiver of a pair of reference receivers; differencing the code range errors of the pair of reference receivers; determining whether the differenced code range error for the pair of reference receivers has converged; determining whether the absolute value of the differenced code range error is less than a second threshold; when the absolute value of the differenced code range error is less than the second threshold, outputting an indication of no gradient for the pair of reference receivers; and when the absolute value of the differenced code range error is not less than the second threshold, outputting an indication that a gradient is present for the pair of reference receivers.

Example 12 includes the method of any of Examples 10-11, further comprising applying compensations to at least one of: the code range error for each reference receiver of the pair of reference receivers; and the differenced code range error of the pair of reference receivers.

Example 13 includes the method of any of Examples 10-12, further comprising filtering the differenced code range error for the pair of reference receivers with a selected time constant, wherein determining whether the differenced code range error for the pair of reference receivers has converged includes waiting for twice as long as the selected time constant.

Example 14 includes the method of any of Examples 10-13, wherein determining a monitor measurement using accumulated carrier data for each pair of reference receivers of a plurality of reference receiver pairs comprises: determining a change in carrier range error for each reference receiver of a pair of reference receivers; differencing the change in carrier range errors for the reference receivers of the pairs of reference receivers; determining the initial carrier range error for the reference receiver pair using carrier phase double differencing; summing the differenced change in carrier range errors with the initial carrier range error for the reference receiver pair using carrier phase double differencing.

Example 15 includes the method of Example 14, wherein determining a monitor measurement using accumulated carrier data for each pair of reference receivers of a plurality of reference receiver pairs further comprises: generating a feedback error signal; and summing the feedback error signal with the differenced change in carrier range errors.

Example 16 includes the method of any of Examples 14-15, further comprising applying compensations to at least one of: the change in carrier range error for each reference receiver of the pair of reference receivers; and the differenced change in carrier range errors for the pair of reference receivers.

Example 17 includes the method of any of Examples 10-16, further comprising selecting the subset of the plurality of reference receiver pairs based on which combination of monitor measurements will result in a smallest gradient estimate.

Example 18 includes the method of any of Examples 10-17, further comprising selecting the subset of the plurality of reference receiver pairs based on which combination of monitor measurements will result in a largest gradient estimate.

Example 19 includes the method of any of Examples 10-19, wherein combining monitor measurements for a subset of the plurality of reference receiver pairs into a monitor discriminator comprises combining monitor measurements for two or more of the reference receiver pairs.

Example 20 includes a non-transitory computer readable medium having processor executable instructions stored thereon which, when executed by one or more processors, cause the one or more processors to perform the steps of: determining whether the line of sight of the newly available satellite is within a gradient; determining a monitor measurement using accumulated carrier data for each pair of reference receivers of a plurality of reference receiver pairs; combining monitor measurements for a subset of the plurality of reference receiver pairs into a monitor discriminator; and outputting an alert when the monitor discriminator exceeds a threshold.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A ground-based system comprising:
   a plurality of reference receivers configured to receive satellite signals; and
   a processor coupled to a memory, wherein the processor is communicatively coupled to the plurality of reference receivers and configured to:
   determine whether a line of sight of a newly available satellite is within an ionosphere gradient;
   when it is determined that the line of sight of the newly available satellite is within an ionosphere gradient, repeat the determination of whether the line of sight of the newly available satellite is within an ionosphere gradient until it is determined that the line of sight of the newly available satellite is not within an ionosphere gradient;
   when it is determined that the line of sight of the newly available satellite is not within an ionosphere gradient,
      determine a monitor measurement using accumulated carrier data for each pair of reference receivers of a plurality of reference receiver pairs, wherein accumulated carrier data is measurement data received from a reference receiver/satellite pair which is comprised of the accumulation of the carrier phase cycles, converted to meters, which have been received since first tracking the satellite signal;
      combine monitor measurements for a subset of the plurality of reference receiver pairs into a monitor discriminator; and
      output an alert when the monitor discriminator exceeds a first threshold.

2. The system of claim 1, wherein the processor is further configured to detect an ephemeris gradient or ephemeris error based on the monitor discriminator exceeding a second threshold.

3. The system of claim 1, wherein determine whether the line of sight of a newly available satellite is within an ionosphere gradient includes determining whether a code carrier divergence (CCD) monitor indicates that the newly available satellite is excluded.

4. The system of claim 1, wherein the plurality of reference receivers includes four reference receivers.

5. The system of claim 4, wherein the subset of the plurality of reference receiver pairs includes two or more reference receiver pairs.

6. The system of claim 5, wherein the two or more reference receiver pairs includes three reference receiver pairs, wherein the three reference receiver pairs collectively include all four reference receivers.

7. The system of claim 1, wherein the alert indicates that an ionosphere gradient is present for the satellite.

8. The system of claim 1, wherein the alert indicates that an ephemeris error is present for the satellite.

9. The system of claim 1, wherein the ground-based system is a Ground Based Augmentation System.

10. A method of operating an ionosphere gradient monitor, the method comprising:
    receiving, with a plurality of reference receivers, radio frequency signals from a newly available satellite;
    determining, with one or more processors communicatively coupled to the plurality of reference receivers, whether a line of sight of the newly available satellite is within an ionosphere gradient;
    when it is determined that the line of sight of the newly available satellite is within an ionosphere gradient, repeating, with the one or more processors, the determination of whether the line of sight of the newly available satellite is within an ionosphere gradient until it is determined that the line of sight of the newly available satellite is not within an ionosphere gradient;
    when it is determined that the line of sight of the newly available satellite is not within an ionosphere gradient,
       determining, with the one or more processors, a monitor measurement using accumulated carrier data for each pair of reference receivers of a plurality of reference receiver pairs, wherein accumulated carrier data is measurement data received from a reference receiver/satellite pair which is comprised of the accumulation of the carrier phase cycles, converted to meters, which have been received since first tracking the satellite signal;
       combining, with the one or more processors, monitor measurements for a subset of the plurality of reference receiver pairs into a monitor discriminator; and
       outputting, with the one or more processors, an alert when the monitor discriminator exceeds a first threshold.

11. The method of claim 10, wherein determining, with the one or more processors communicatively coupled to the plurality of reference receivers, whether the line of sight of the newly available satellite is within an ionosphere gradient comprises:
    determining a code range error for each reference receiver of a pair of reference receivers;
    differencing the code range errors of the pair of reference receivers;
    determining whether the differenced code range error for the pair of reference receivers has converged;
    determining whether an absolute value of the differenced code range error is less than a second threshold;
    when the absolute value of the differenced code range error is less than the second threshold, outputting an indication of no ionosphere gradient for the pair of reference receivers; and
    when the absolute value of the differenced code range error is not less than the second threshold, outputting an indication that an ionosphere gradient is present for the pair of reference receivers.

12. The method of claim 11, further comprising applying, with the one or more processors, compensations to at least one of:

the code range error for each reference receiver of the pair of reference receivers; and the differenced code range error of the pair of reference receivers.

13. The method of claim 11, further comprising filtering, with the one or more processors, the differenced code range error for the pair of reference receivers with a selected time constant, wherein determining whether the differenced code range error for the pair of reference receivers has converged includes waiting for twice as long as the selected time constant.

14. The method of claim 10, wherein determining, with the one or more processors, a monitor measurement using accumulated carrier data for each pair of reference receivers of a plurality of reference receiver pairs comprises:

determining a change in carrier range error for each reference receiver of a pair of reference receivers;

differencing the change in carrier range errors for the reference receivers of the pairs of reference receivers;

determining an initial carrier range error for the reference receiver pair using carrier phase double differencing;

summing the differenced change in carrier range errors with the initial carrier range error for the reference receiver pair using carrier phase double differencing.

15. The method of claim 14, wherein determining, with the one or more processors, a monitor measurement using accumulated carrier data for each pair of reference receivers of a plurality of reference receiver pairs further comprises:

generating a feedback error signal; and summing the feedback error signal with the differenced change in carrier range errors.

16. The method of claim 14, further comprising applying, with the one or more processors, compensations to at least one of:

the change in carrier range error for each reference receiver of the pair of reference receivers; and the differenced change in carrier range errors for the pair of reference receivers.

17. The method of claim 10, further comprising selecting, with the one or more processors, the subset of the plurality of reference receiver pairs based on which combination of monitor measurements will result in a smallest gradient estimate.

18. The method of claim 10, further comprising selecting, with the one or more processors, the subset of the plurality of reference receiver pairs based on which combination of monitor measurements will result in a largest gradient estimate.

19. The method of claim 10, wherein combining, with the one or more processors, monitor measurements for a subset of the plurality of reference receiver pairs into a monitor discriminator comprises combining monitor measurements for two or more of the reference receiver pairs.

20. A non-transitory computer readable medium having processor executable instructions stored thereon which, when executed by one or more processors, cause the one or more processors to perform the steps of:

receiving processed satellite signals from a plurality of reference receivers;

determining whether a line of sight of the newly available satellite is within an ionosphere gradient;

when it is determined that the line of sight of the newly available satellite is within an ionosphere gradient, repeating the determination of whether the line of sight of the newly available satellite is within an ionosphere gradient until it is determined that the line of sight of the newly available satellite is not within an ionosphere gradient;

when it is determined that the line of sight of the newly available satellite is not within an ionosphere gradient, determining a monitor measurement using accumulated carrier data for each pair of reference receivers of a plurality of reference receiver pairs, wherein accumulated carrier data is measurement data received from a reference receiver/satellite pair which is comprised of the accumulation of the carrier phase cycles, converted to meters, which have been received since first tracking the satellite signal;

combining monitor measurements for a subset of the plurality of reference receiver pairs into a monitor discriminator; and outputting an alert when the monitor discriminator exceeds a threshold.

* * * * *